United States Patent
Matsunaga et al.

(10) Patent No.: US 6,896,836 B2
(45) Date of Patent: May 24, 2005

(54) VULCANIZATION PROCESS FOR PNEUMATIC TIRE AND MOLD THEREFOR

(75) Inventors: Hiroo Matsunaga, Kodaira (JP); Takeshi Hamachi, Kodaira (JP); Miyoji Kishimoto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 98 days.

(21) Appl. No.: 09/993,504

(22) Filed: Nov. 27, 2001

(65) Prior Publication Data

US 2002/0100538 A1 Aug. 1, 2002

(30) Foreign Application Priority Data

Nov. 29, 2000 (JP) ......................................... 2000-363299

(51) Int. Cl.⁷ ........................... B29C 33/10; B29C 35/02
(52) U.S. Cl. ........................... 264/326; 425/36; 425/46; 425/47; 425/812
(58) Field of Search ................................ 156/87, 110.1; 264/315, 326; 425/28.1, 35, 36, 46, 47, 812

(56) References Cited

U.S. PATENT DOCUMENTS

| | | | | |
|---|---|---|---|---|
| 1,380,085 A | * | 5/1921 | Walton | |
| 3,467,989 A | * | 9/1969 | Youngblood et al. | |
| 3,972,978 A | * | 8/1976 | Caretta | |
| 4,492,554 A | * | 1/1985 | Carter | ..................... 425/28.1 |
| 4,662,833 A | | 5/1987 | Carter | |
| 4,759,701 A | * | 7/1988 | Carter | |
| 5,141,424 A | * | 8/1992 | Christof | |
| 5,234,326 A | * | 8/1993 | Galli et al. | |
| 5,769,976 A | * | 6/1998 | Omokawa et al. | |
| 5,798,076 A | * | 8/1998 | Ladouce | |
| 6,017,206 A | * | 1/2000 | Soulalioux | |
| 2001/0002604 A1 | * | 6/2001 | Ikeda | |

FOREIGN PATENT DOCUMENTS

| | | | |
|---|---|---|---|
| GB | 1 016 124 A | | 1/1966 |
| JP | 64-53816 | * | 3/1989 |
| JP | 8-47929 | * | 2/1996 |
| JP | 09-183124 A | | 7/1997 |
| JP | 10-044156 A | | 2/1998 |
| JP | 10-138249 A | | 5/1998 |

* cited by examiner

*Primary Examiner*—Steven D. Maki
(74) *Attorney, Agent, or Firm*—Sughrue Mion, PLLC

(57) ABSTRACT

A pneumatic tire comprising a tread portion, a pair of sidewall portions and a pair of bead portions is manufactured by conducting the venting in a portion of a green tire placed in a vulcanization mold prior to vulcanization and corresponding to the sidewall portion in at least one place in a radial direction of the tire during the vulcanization.

15 Claims, 7 Drawing Sheets

VULCANIZATION PROCESS FOR PNEUMATIC TIRE AND MOLD THEREFOR

BACKGROUND OF THE INVENTION

1. Field of the Invention

This invention relates to a vulcanization process for a pneumatic tire and a mold used therefor and is advantageously applicable to the production of a pneumatic radial tire having a thin rubber gauge in a sidewall portion.

2. Description of Related Art

In the production of the conventionally general pneumatic radial tire wherein a gauge of a sidewall rubber in a sidewall portion exceeds 3 mm at substantially a position of a maximum tire width, when a green tire after the shaping is vulcanized in a vulcanization mold or so-called split mold comprising a tread ring comprised of plural segments reciprocatively moving in a radial direction, a pair of side portion rings and a bead portion ring, it is general that air remaining in the mold, and gases produced therein are discharged through many ventholes toward the outside of the mold. As a result, many spews formed in the ventholes remain in a product tire after the vulcanization.

According to the conventional technique, therefore, there are problems that the yield of rubber material is lowered by forming many spews and the cutting removal of the spews from the product tire increases the working number and further the spew-cut traces spoil the appearance of the tire.

Recently, it is attempted to decrease the rubber gauge of the sidewall portion under a requirement of reducing the tire weight. In this case, a sectional area of a path for flowing rubber is decreased in the vulcanization of the green tire and hence the flowing resistance of the sidewall rubber is increased to obstruct the smooth flowing of the sidewall rubber, so that the smooth discharge of air and the like in the mold toward the outside of the mold accompanied with the rubber flowing is obstructed to increase a fear of creating bares in the product tire. In order to prevent the occurrence of such a bare, it is required to arrange the ventholes in the mold as large as possible and hence there is caused a problem that it is obliged to form much more spews.

SUMMARY OF THE INVENTION

It is, therefore, an object of the invention to solve the aforementioned problems of the conventional technique and to provide a vulcanization process for a pneumatic tire and a mold used therefor, wherein the number of ventholes formed in the side portion ring for the shaping of the sidewall portion and the like is fairly decreased as compared with that of the conventional technique even when the rubber gauge required for the sidewall portion in the product tire is thick or thin and air and the like inside the mold are smoothly and sufficiently discharged toward the outside of the mold to prevent the occurrence of the bare and also to effectively prevent the occurrence of various problems resulted from the formation of many spews.

In the vulcanization process for the pneumatic tire comprising a tread portion, a pair of sidewall portions and a pair of bead portions according to the rate invention, though the rubber gauge of the sidewall portion at substantially a position of a maximum tire width exceeds 3.0 mm or is within a range of 0.5–3.0 mm, the venting is carried out in a portion of a tire placed in a vulcanization mold prior to vulcanization and corresponding to the sidewall portion in at least one place in a radial direction of the tire, preferably 2 to 3 places over a full circumference of the tire.

In this case, the venting may be conducted, for example, by a narrow gap formed in the side portion ring for the shaping of the sidewall portion and the like which allows to get out gases but prevents the inflow of rubber, preferably a gap having a width of about 10–30 $\mu$m. By such a narrow gap of an annular ring shape formed in at least one position in the radial direction of the tire is smoothly and sufficiently discharged the gases inside the mold toward the outside of the mold, whereby the fear of creating the bares can effectively be removed while sufficiently preventing the staying of the gases inside the mold under the formation of the venthole that the number of ventholes is considerably reduced as compared with that of the conventional technique even if the rubber gauge of the sidewall portion is thin and the flow of rubber is low.

As a result, the number of spews itself is reduced and also rubber is not flowed into the above narrow gap in the side portion ring, so that the yield of the rubber material is improved and the working number for cutting the spews and the like is reduced and also the degradation of tire appearance can advantageously be prevented.

The vulcanization mold for the pneumatic tire according to the invention comprises a tread ring comprised of plural segments reciprocatively displacing in a radial direction and contributing to shape a tread portion, a pair of side portion rings mainly contributing to shape a pair of sidewall portions, and a bead portion ring contributing to shape a bead portion, in which a venting gap preferably having a width of 10–30 $\mu$m is arranged in at least one place of the side portion ring in the radial direction so as to extend over a full circumference of the ring and pass through the ring from the inside toward the outside thereof.

In the mold according to the invention, the venting gap in the side portion ring is made narrow to sufficiently allow the discharge of gases in the mold toward the outside of the mold and prevent the inflow of rubber into the gap as previously mentioned, whereby the discharge of the gases in the mold toward the outside of the mold can be conducted under the formation of few or more ventholes even if the flow of the sidewall rubber is low.

It is preferable that the venting gap is disposed in a position of forming a bead guard of the pneumatic tire for preventing the rubbing to a rim flange, more concretely an outer peripheral edge of such a forming position and/or at least one of a position corresponding to a turnup end of a carcass ply in a shaped tire or a green tire to be placed in the mold, a position corresponding to an outer end of a bead filler in a radial direction and a position corresponding to a neighborhood of a side edge of a tread portion.

In the former case, when rubber in the green tire after the shaping is flowed along an inner surface of the mold, the contact of the rubber with the inner surface of the mold can particularly be delayed to realize the sufficient discharge of the gas from a place encapsulating the gas therein. In the latter case, step is created in the green tire itself, whereby the smooth discharge of the gas can be conducted from a place easily forming a gas reservoir in the mold.

When the width or clearance of the venting gap is within a range of 10–30 μm, the smooth discharge of the gas in the mold is guaranteed and the occurrence of spew resulted from the inflow of rubber into the gap is prevented. And also, it is favorable to arrange a plurality of fine grooves introducing the gas in the mold into the venting gap in an inner part of the side portion ring at both inward and outward sides with respect to the venting gap in the radial direction.

In the invention, the venting gap in the side portion ring can be formed between sub-rings positioned inward and outward in the radial direction and integrally united with each other to constitute the side portion ring. For this end, if it is intended to arrange two to three venting gaps, it is required to concentrically arrange three to four sub-rings and integrally connect them to each other.

Moreover, it is favorable that the sub-rings are connected to each other in a rigid structure under an action of bolts, connecting pins and the like, whereby the given size of the venting gap can accurately be ensured and the handling of the side portion ring can be facilitated.

And also, the venting gaps are formed among plural sub-rings placed inward and outward in the radial direction so as to constitute the side portion ring, and opposed surfaces of the mutual sub-rings are slant faces inclining with respect to the radial direction, and at least one sub-ring among these sub-rings is energized by a spring or the like so as to enlarge the venting gap. In this case, the venting gap is maintained at an enlarged state by supplying a pressurized fluid such as pressurized steam or the like to an inside of a tire placed in the mold of a closed posture prior to the vulcanization until the tire is closed to the inner surface of the mold, whereby the discharge of an initially sealed gas toward the outside of the mold can be conducted from the enlarged venting gap. After the tire is closed to the inner surface of the mold, the sub-ring is displaced in the tooth of the energizing force for the sub-ring under an action of an internal pressure in the tire, whereby the discharge of gases produced during the vulcanization toward the outside of the mold can smoothly be conducted from the venting gap.

In the mold having the above structure, it is favorable that a chamfered portion or a notched portion communicating with the venting gap is arranged in a surface of at least one sub-ring among the adjoining sub-rings placed inward and outward in the radial direction contacting with the tire before the vulcanization.

In this case, when the green tire is vulcanized in the mold, the flowing pressure of the sidewall rubber during the vulcanization is mitigated by the arrangement of the chamfered portion or the notched portion, whereby the inflow of the sidewall rubber into the venting gap and hence the occurrence of the spew can be more advantageously prevented.

And also, the chamfered portion or the notched portion can be functioned by properly selecting a cross-sectional shape thereof to improve the appearance of the tire and shape a design rib for protection of the sidewall portion or the like.

BRIEF DESCRIPTION OF THE DRAWINGS

The invention will be described with reference to the accompanying drawings, wherein.

DETAILED DESCRIPTION OF THE INVENTION

Figure 1:
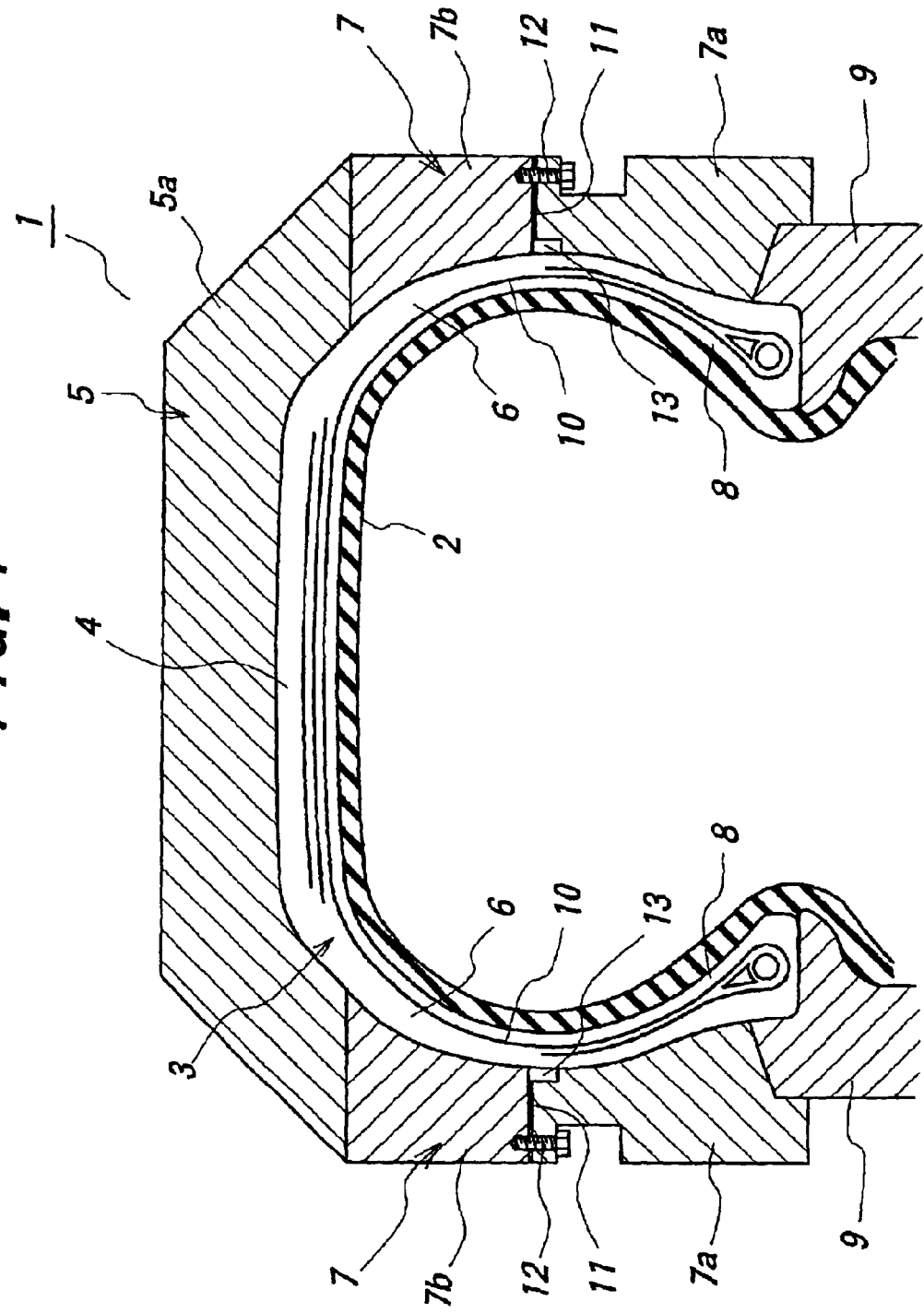
FIG. 1 is a diagrammatically partial section view of an embodiment of the vulcanization mold according to the invention in a widthwise direction thereof.

In FIG. 1 is sectionally shown a vulcanization step of a tire in a vulcanization mold, wherein numeral 1 is a vulcanization mold, numeral 2 a bladder, numeral 3 a green tire placed in the vulcanization mold of a closed posture and pushed onto an inner surface of the mold as a shaping face through the bladder 2 prior to the vulcanization.

The vulcanization mold I comprises a tread ring 5 contributing to shape a tread portion 4 of the green tire and vulcanize it, a pair of side portion rings 7 each mainly contributing to shape a sidewall portion 6 and the like and a pair of bead portion rings 9 each contributing to shape a bead portion 8 and the like. A product tire vulcanized in the vulcanization mold 1 has a sidewall rubber gauge within a range of 0.5–3.0 mm at an outside of a carcass 10, for example, in the vicinity of a position of a maximum tire width.

The tread ring 5 comprises a plurality of segments 5a divided in a circumferential direction of the ring and reciprocatively displacing in a radial direction. Each of these segments 5a contacts with the green tire 3 over substantially a full width of the tread portion 4.

The side portion ring 7 contacts with the green tire 3 from a position adjacent to the tread ring segments 5a up to a position corresponding to a middle position of a part of the bead portion of the product tire contacting with a rim flange, and is provided at one place in the radial direction with a venting gap 11 annularly extending over a full circumference and passing through the ring from inside toward outside thereof.

The bead portion ring 9 contacts with the green tire 3 from a position adjacent to the side portion ring 7 to a portion corresponding to a bead base of the product tire.

As shown in FIG. 1, the venting gap 11 in the side portion ring 7 is defined by two sub-rings 7a, 7b concentrically dividing the side portion ring 7 inward and outward in the radial direction. That is, when these sub-rings 7a, 7b are connected at a given clearance to each other through connecting pins, bolts 12 or the like in a rigid structure, such a clearance corresponds to the venting gap 11. In FIG. 1, the venting gap 11 is formed in a place corresponding to a neighborhood of a position of a maximum width of the product tire and has a width or clearance that allows to discharge gases in the mold toward the outside of the mold but prevents inflow of rubber into the gap, preferably a width of about 10–30 μm.

Moreover, the venting gap 11 may be arranged in two to three places, or four or more places in the radial direction.

In case of arranging plural venting gaps, the discharge of gases in mold toward the outside of the mold can be more smoothly and sufficiently conducted even when the flow of the sidewall rubber is low One of the sub-rings contacts the tread ring and another of the sub-rings contacts the bead portion ring.

Preferably, a chamfered portion or a notched portion communicating with the venting gap 11 is disposed in a surface of at least one of the sub-rings 7a, 7b contacting with the green tire 3 so as to position adjacent to opposed surfaces of the mutual sub-rings 7a, 7b. In the illustrated embodiment, a notched portion 13 is disposed in such a surface and has, for example, a cross-sectional area of 1.5×1.5 mm.

In the vulcanization mold having the above structure, when the green tire 3 is expanded by the bladder 2 at a closed state of the mold 1 to push onto an inner surface of the mold and then vulcanized, even if the gauge of the sidewall rubber in the sidewall portion 6 is thin and the flow of rubber is small, only air and other gases retaining between the tire and the mold can smoothly and surely be discharged through the venting gap 11 extending over a full circumference of the sidewall portion 6 toward the outside of the mold without entering rubber, so that the number of ventholes and hence the number of spews can considerably be decreased as compared with the conventional technique and the occurrence of bare can sufficiently be prevented.

In the vulcanization of the green tire 3, as shown in FIG. 1, a part of the sidewall rubber is intentionally flowed into the notched portion 13 to reduce an internal pressure of the sidewall rubber, whereby the accidental inflow of rubber into the venting gap 11 can be prevented more effectively. Further, a projected strip annularly formed by the notched portion 13 can be served as a design rib. As a result, it is sufficient to cut out only a small number of spews as a post treatment for the product tire.

Figure 2:
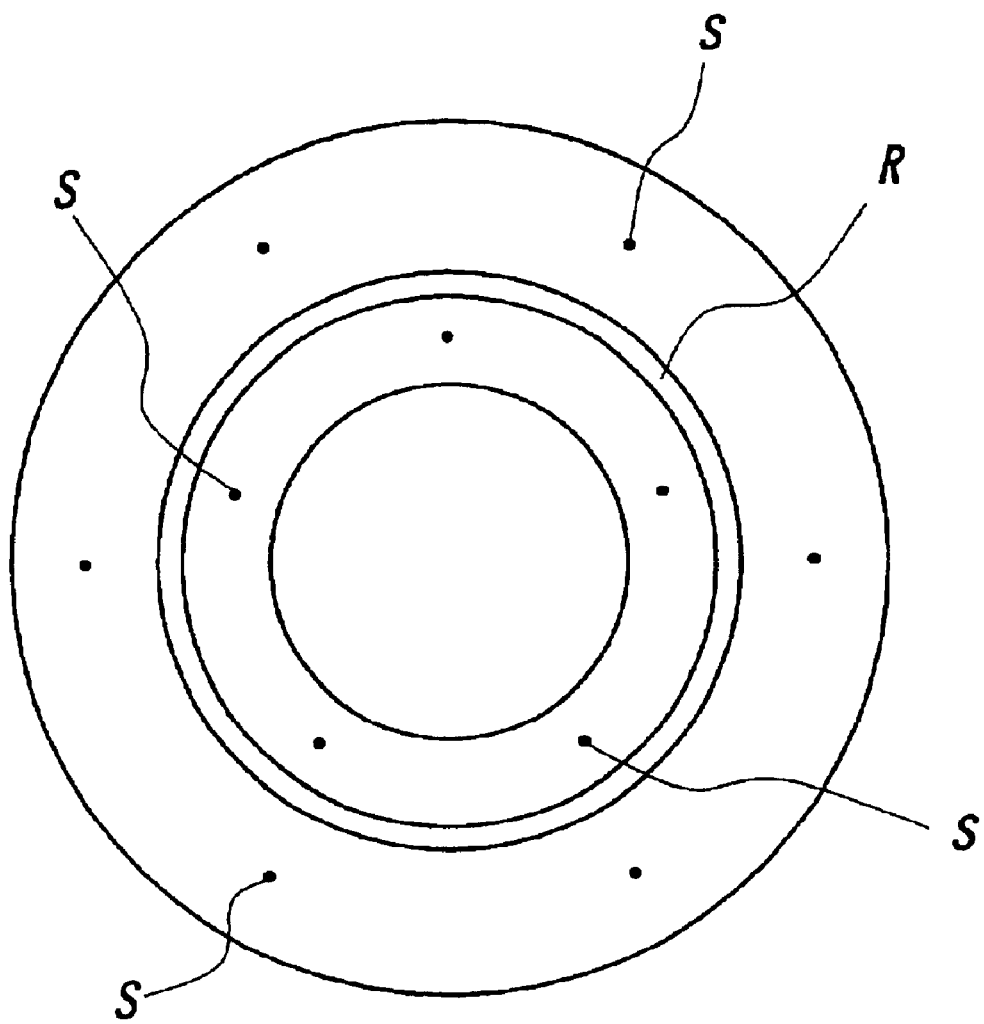
FIG. 2 is a schematically side view of a product tire.

In FIG. 2 is shown a side view of the product tire after the vulcanization, wherein symbol R is a design rib and symbol S is a trace after the cutting of the spews fairly decreased as compared with the spew number in the conventional technique.

In this way, the occurrence of the bare can sufficiently be prevented but also the number of ventholes and the number of spews are decreased to increase the yield of the rubber material, and also the number of working steps required for the post treatment can advantageously be decreased to improve the appearance of the tire itself.

Figure 3:
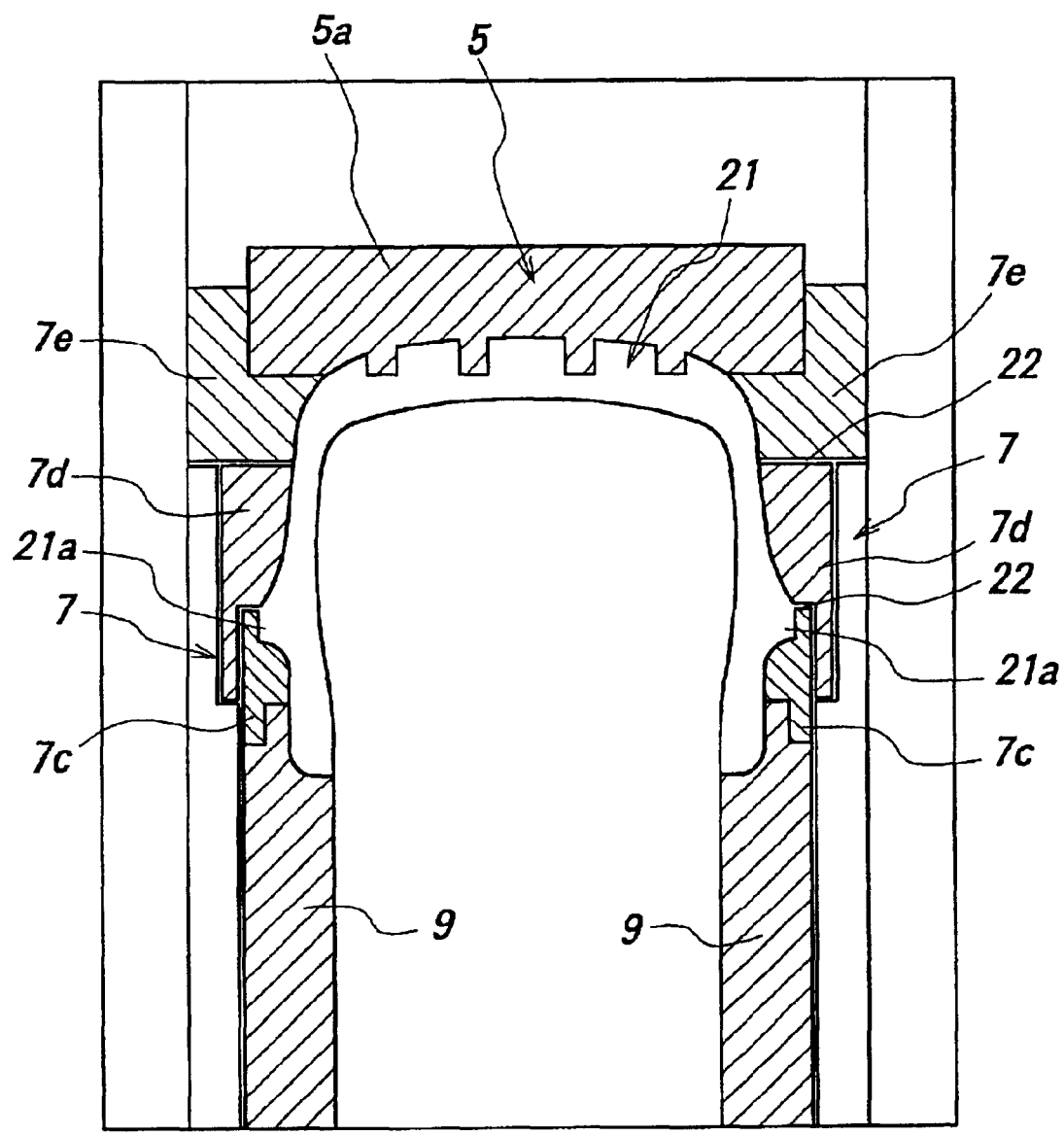
FIG. 3 is a diagrammatically partial section view of another embodiment of the vulcanization mold according to the invention.

In FIG. 3 is sectionally shown another embodiment of the vulcanization mold according to the invention after the vulcanization of the green tire. Numeral 21 is a pneumatic tire as a product tire.

In this embodiment, the side portion ring 7 is comprised of three subrings 7c, 7d, 7e concentrically arranged inward and outward in the radial direction, and venting gaps 22 passing through the side portion ring 7 from the inside toward the outside are formed between inner side sub-ring 7c and middle sub-ring 7d and between middle sub-ring 7d and outer side sub-ring 7e at a position corresponding to a radially outer edge of a forming position of a bead guard 21a of the tire 21 for preventing the rubbing to a rim flange and a position corresponding to a turnup end of a carcass ply in the product tire, respectively.

Moreover, the venting gaps may be formed at a position corresponding to a radially outer end of a bead filler in the product tire, a position corresponding to a neighborhood of a side end of a tread portion and the like (not shown) instead of the above positions or in addition to the above positions.

Figure 4:
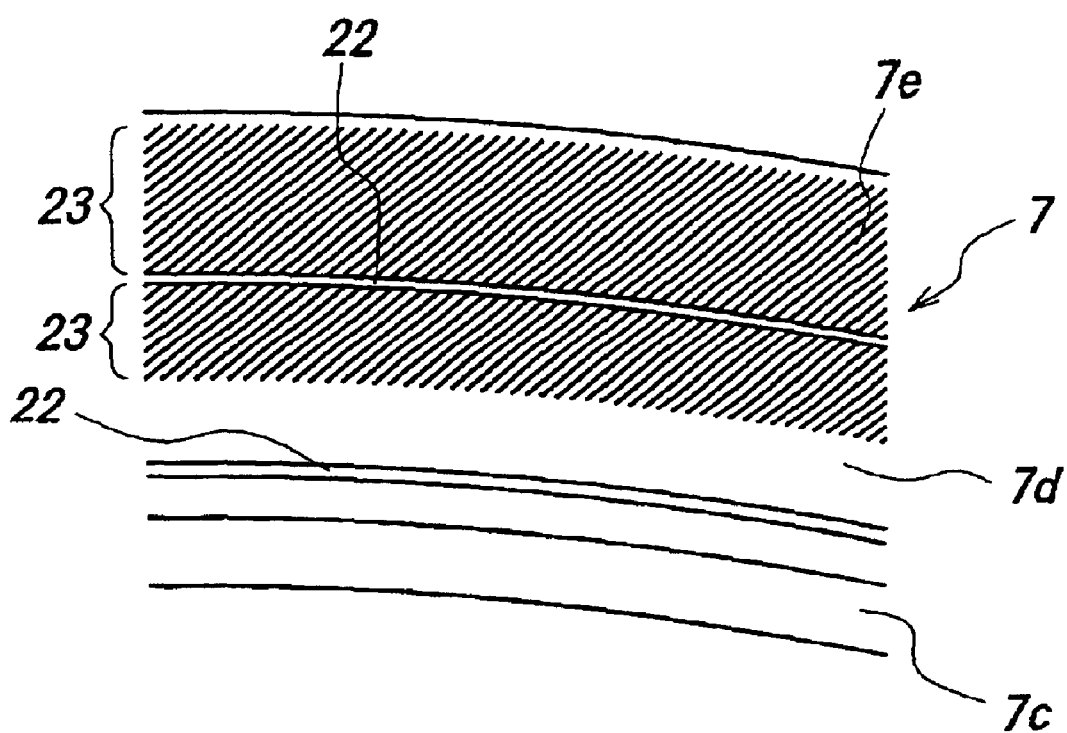
FIG. 4 is a schematic view illustrating an inner surface of a side portion ring in the other embodiment of the vulcanization mold according to the invention.

In FIG. 4 is shown an inner surface of a side portion ring in the other embodiment of the vulcanization mold according to the invention. A plurality of fine grooves 23 introducing gases in the mold into a venting gap 22 are formed on a middle sub-ring 7d and an outer peripheral side sub-ring 7e located inward and outward with respect to such a venting gap 22 in the radial direction.

In a pneumatic tire 21 after the vulcanization using the side portion ring 7 provided with such fine grooves 23 are formed uneven strips corresponding to these fine grooves 23. Such uneven strips can serve as a decorative band of the tire.

Figure 5:
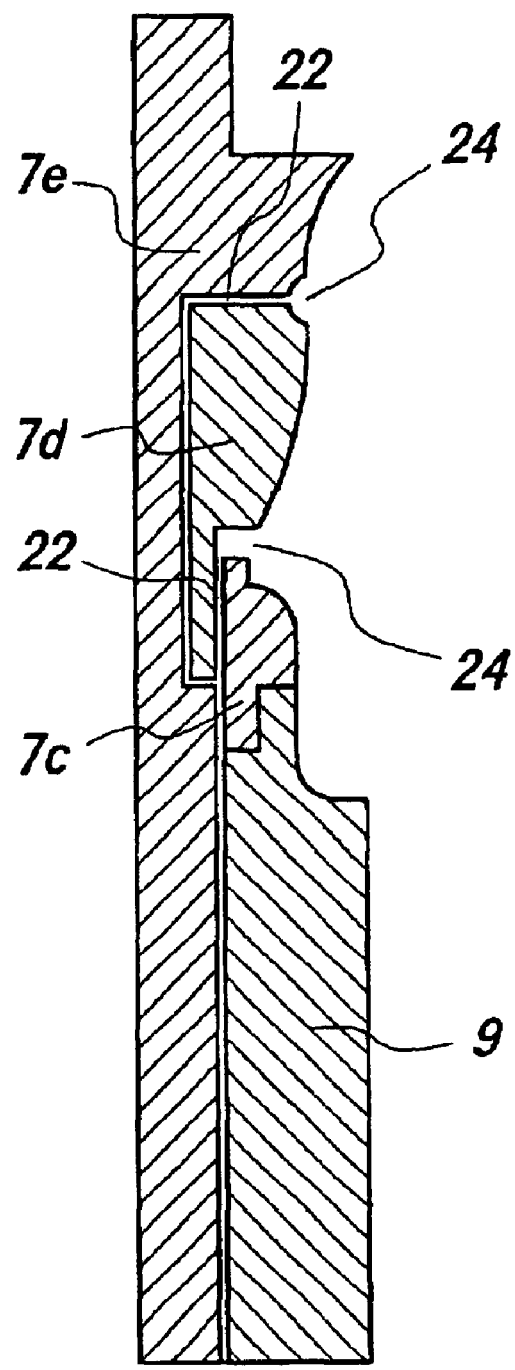
FIG. 5 is a diagrammatically section view illustrating a side portion ring in a still further embodiment of the vulcanization mold according to the invention.

In FIG. 5 is shown a still further embodiment of the vulcanization mold according to the invention, wherein a notched portion 24 is formed in each of sub-ring pairs (7c, 7d, 7e) defining the venting gaps 22.

Figure 6:
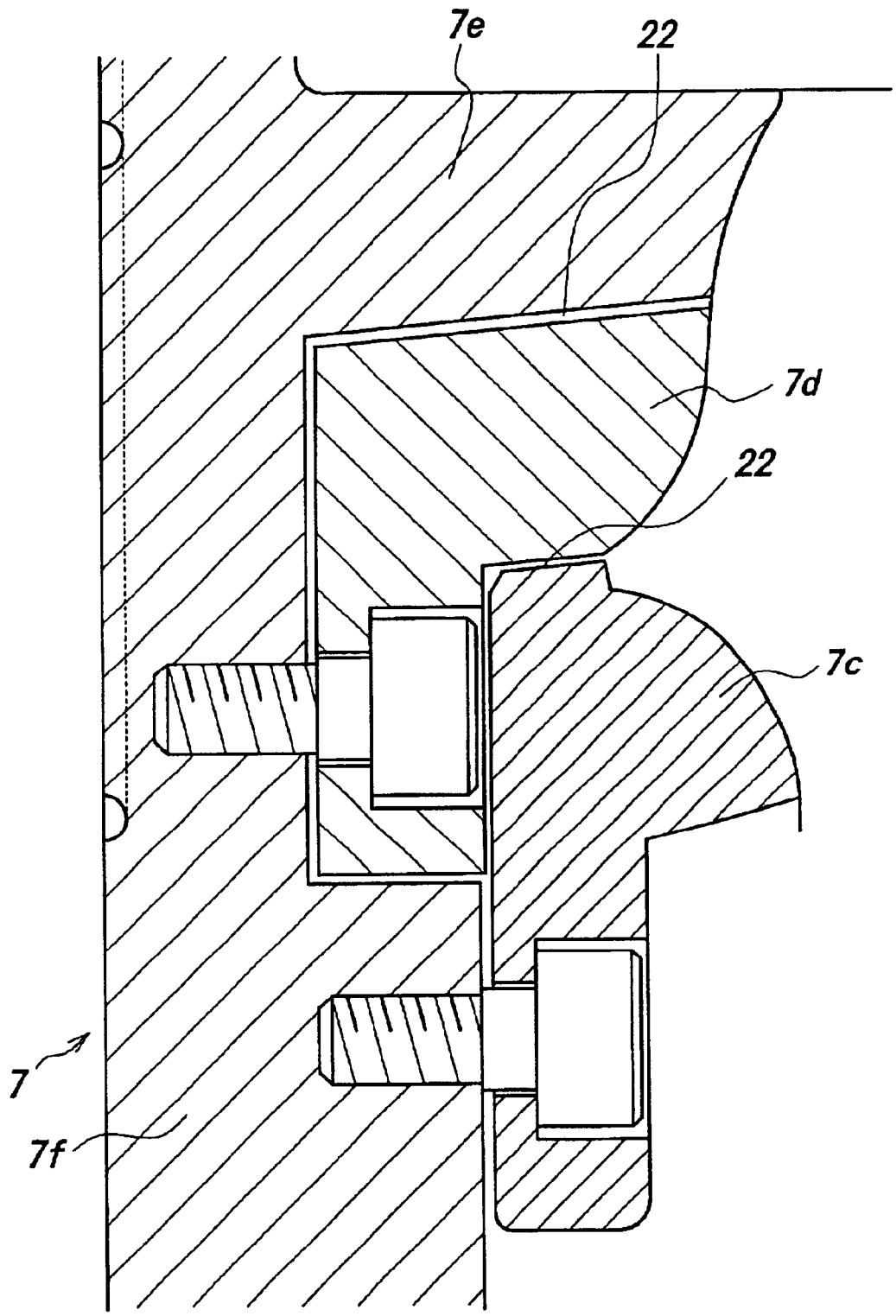
FIG. 6 is a diagrammatically partial section view illustrating an integrally united structure of a side portion ring.
Figure 7:
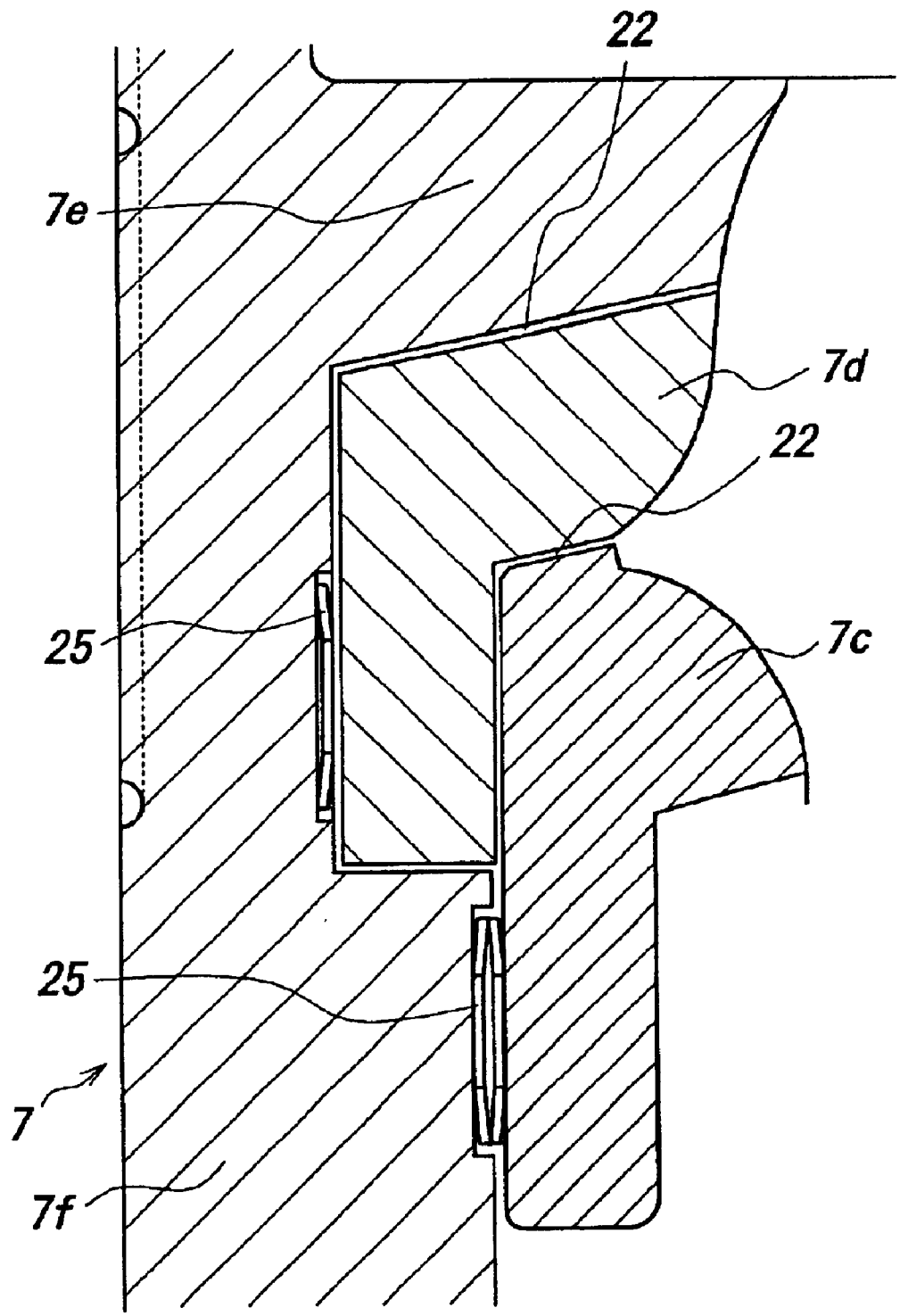
FIG. 7 is a diagrammatically partial section view illustrating a spring-energized structure of a side portion ring.

In these side portion rings 7, the sub-rings 7a, 7b or 7c, 7d, 7e can be integrally connected to each other in a rigid structure at a state of ensuring a constant venting gap 22 as shown in FIG. 1 or FIG. 6. Alternatively, as shown in FIG. 7, opposed surfaces of the middle sub-ring 7d and the inner peripheral side sub-ring 7c or the outer peripheral side sub-ring 7e are slant faces inclining at an equal inclination angle inward and outward in the same direction with respect to the radial direction, and each of the inner peripheral side sub-ring 7c and the middle sub-ring 7d can be energized by a spring means 25 such as disc spring or the like with respect to a ring base 7f integrally united with the outer peripheral side sub-ring 7e so as to enlarge the venting gaps 22. In the latter case, the venting gap 22 is maintained at an enlarged state until a force overcoming the spring force of the spring manes 25 is applied to the mold to enlarge a volume in the mold, whereby the smooth and rapid discharge of the gases in the mold can be guaranteed.

The following examples are given in illustration of the invention and are not intended as limitations thereof.

There are provided tires of Examples 1 and 2 and conventional tire, each having a tire size of 225/60R15 and comprising a carcass of one rubberized carcass ply containing polyester cords of 1500d/2 arranged side by side so as to extend in a direction perpendicular to an equatorial plane of the tire, in which each side portion of the carcass ply is wound from an inside toward an outside in a widthwise direction of the tire and a turnup end thereof is located in the vicinity of a position corresponding to a maximum tire width.

In the tire of Example 1, a design rib of 1.5×1.5 mm is formed on each sidewall portion after the vulcanization in a mold shown in FIG. 1.

In the tire of Example 2, the vulcanization is carried out in the mold shown in FIG. 1 except that the notched portion 13 is not formed.

In the conventional tire, the vulcanization is carried out in the conventional mold, wherein the side portion ring is one-piece ring having no venting gap.

In all tires, a sidewall rubber gauge is 4 mm in the vicinity of the position of the maximum tire width.

With respect to these tires, the post treating property of a product tire after the vulcanization, appearance and the like are evaluated to obtain results as shown in Table 1.

TABLE 1

| | Conventional tire (one-piece side portion ring, number of spews (index): 100) | Example tire 1 (split-type side portion ring having chamfered portions, number of spews (index): 100/15) | Example tire 2 (split-type side portion ring having no chamfered portion, number of spews (index): 100/15) |
|---|---|---|---|
| Workability for removal of spews (index)* | 100 | 80 | 80 |
| Appearance after removal of spews | poor | no problem | no problem |
| Occurrence of bare (sidewall portion) | none | none | none |
| Total judgment | large working quantity, poor appearance | small working quantity, good appearance | small working quantity, (handling occurs) |

*The smaller the index value, the better the workability.

As mentioned above, according to the invention, the smooth and sufficient discharge of gases in the mold can be conducted toward the outside of the mold by the venting gap disposed in the side portion ring even if the rubber gauge in the sidewall portion becomes thinner and the flow of the rubber becomes less in the vulcanization, whereby the number of ventholes can be reduced and the occurrence of bare can be prevented sufficiently. As a result, the yield of the sidewall rubber is improved and the number of working steps required for the cut and removal of spews is largely decreased and also the lowering of the appearance resulted from spew-cut traces is effectively prevented.

What is claimed is:

1. A process for vulcanization of a pneumatic tire comprising a tread portion, a pair of sidewall portions and a pair of bead portions, comprising:

venting a gas in a vulcanization mold received with an uncured product of the pneumatic tire at a position corresponding to the sidewall portion from a venting gap formed between two or more sub-rings of a side portion ring of the vulcanization mold in at least one location of the side portion ring in a radial direction of the tire so as to extend over a full circumference of the ring, and to extend across a full width of the side portion ring; wherein one of said two or more sub-rings contacts a tread ring of the vulcanization mold for forming the tread portion and another of said two or more sub-rings contacts a bead portion ring of the vulcanization mold for forming one of the bead portions.

2. A vulcanization mold for a pneumatic tire comprising:

a tread ring comprised of plural segments reciprocatively displacing in a radial direction and contributing to shape a tread portion;

a pair of side portion rings mainly contributing to shape a pair of sidewall portions, and each comprised of two or more sub-rings; and a bead portion ring contributing to shape a bead portion, in which a venting gap is arranged between the two or more sub-rings in at least one location of the side portion ring in the radial direction so as to extend over a full circumference of the ring and pass through the ring from the inside toward the outside thereof, and to extend across a full width of the side portion ring, wherein one of said two or more sub-rings contacts the tread ring and another of said two or more sub-rings contacts the bead portion ring.

3. A vulcanization mold according to claim 2, wherein the venting gap is disposed where a bead guard of the pneumatic tire is formed for preventing rubbing with a rim flange.

4. A vulcanization mold according to claim 2, wherein the venting gap has a clearance of 10–30 μm.

5. A vulcanization mold according to claim 2, wherein a plurality of fine grooves introducing gas in the mold into the venting gap in an inner part of the side portion ring are arranged at both inward and outward sides with respect to the venting gap in the radial direction.

6. A vulcanization mold according to claim 2, wherein the sub-rings are positioned inward and outward in the radial direction and integrally united with each other.

7. A vulcanization mold according to claim 2, wherein the sub-rings are positioned inward and outward in the radial direction, and opposed sur-faces of the sub-rings are slant faces inclining with respect to the radial direction, and at least one of the sub-rings is energized by a spring or the like so as to enlarge the venting gap.

8. A vulcanization mold according to claim 6, wherein a chamfered portion or a notched portion communicating with the venting gap is arranged in a surface of at least one of the sub-rings contacting with the tire before the vulcanization.

9. A vulcanization mold according to claim 7, wherein a chamfered portion or a notched portion communicating with the venting gap is arranged in a surface of at least one of the sub-rings contacting with the tire before the vulcanization.

10. A process for vulcanization of a pneumatic tire comprising a tread portion, a pair of sidewall portions and a pair of bead portions using a vulcanization mold, comprising:

venting a gas in the vulcanization mold received with an uncured product of the pneumatic tire at a position corresponding to the sidewall portion from a venting gap formed between two or more sub-rings of a side portion ring of the vulcanization mold in at least one location of the side portion ring in a radial direction of the tire, the venting gap extending over a full circumference of the side portion ring and passing through the side portion ring from the inside toward the outside thereof, wherein the sub-rings are placed inward and outward in the radial direction, and opposed surfaces of the mutual sub-rings are slant faces inclining with respect to the radial direction, and at least one sub-ring among these sub-rings is energized by a spring or the like so as to enlarge the venting gap.

11. A process according to claim 10, wherein a chamfered portion or a notched portion communicating with the venting gap is arranged in a surface of at least one sub-ring among the adjoining sub-rings placed inward and outward in the radial direction contacting with the tire before the vulcanization.

12. A vulcanization mold for a pneumatic tire comprising:
a tread ring comprised of plural segments reciprocatively displacing in a radial direction and contributing to shape a tread portion;
a pair of side portion rings mainly contributing to shape a pair of sidewall portions, and each comprised of two or more sub-rings; and
a bead portion ring contributing to shape a bead portion,
in which a venting gap is arranged between the two or more sub-rings in at least one location of the side portion ring in the radial direction so as to extend over a full circumference of the ring and pass through the ring from the inside toward the outside thereof,
wherein the sub-rings are positioned inward and outward in the radial direction, and opposed surfaces of the sub-rings are slant faces inclining with respect to the radial direction, and at least one of the sub-rings is energized by a spring or the like so as to enlarge the venting gap.

13. A vulcanization mold according to claim 12, wherein a chamfered portion or a notched portion communicating with the venting gap is arranged in a surface of at least one of the sub-rings contacting with the tire before the vulcanization.

14. A vulcanization mold for a pneumatic tire comprising:
a tread ring comprised of plural segments reciprocatively displacing in a radial direction and contributing to shape a tread portion;
a pair of side portion rings mainly contributing to shape a pair of sidewall portions, and each comprised of two or more sub-rings; and
a bead portion ring contributing to shape a bead portion,
in which a venting gap is arranged between the two or more sub-rings in at least one location of the side portion ring in the radial direction so as to extend over a full circumference of the ring and pass through the ring from the inside toward the outside thereof, and to extend across the side ring portion and open to an outside of the mold;
wherein the sub-rings are positioned inward and outward in the radial direction, and opposed surfaces of the sub-rings are slant faces inclining with respect to the radial direction, and at least one of the sub-rings is energized by a spring or the like so as to enlarge the venting gap.

15. A vulcanization mold according to claim 14, wherein a chamfered portion or a notched portion communicating with the venting gap is arranged in a surface of at least one of the sub-rings contacting with the tire before the vulcanization.

* * * * *